US 7,997,172 B2

(12) United States Patent
Hyatt et al.

(10) Patent No.: US 7,997,172 B2
(45) Date of Patent: Aug. 16, 2011

(54) TURNING METHOD AND APPARATUS

(75) Inventors: Gregory Hyatt, South Barrington, IL (US); Abhijit Sahasrabudhe, Wheeling, IL (US)

(73) Assignee: Mori Seiki USA, Inc., Rolling Meadows, IL (US)

( * ) Notice: Subject to any disclaimer, the term of this patent is extended or adjusted under 35 U.S.C. 154(b) by 746 days.

(21) Appl. No.: 11/853,667

(22) Filed: Sep. 11, 2007

(65) Prior Publication Data
US 2008/0060491 A1   Mar. 13, 2008

Related U.S. Application Data

(60) Provisional application No. 60/843,778, filed on Sep. 11, 2006.

(51) Int. Cl.
B23B 1/00 (2006.01)
B23B 3/00 (2006.01)
(52) U.S. Cl. .............................. 82/1.11; 82/118; 82/117
(58) Field of Classification Search ................... 82/1.11, 82/117, 118, 124; 29/39, 27 R, 27 C
See application file for complete search history.

(56) References Cited

U.S. PATENT DOCUMENTS

| | | | |
|---|---|---|---|
| 4,006,518 A * | 2/1977 | Rudolph et al. | 29/39 |
| 4,135,239 A * | 1/1979 | Hamill et al. | 700/180 |
| 4,538,945 A | 9/1985 | Goedecke et al. | |
| 5,284,076 A | 2/1994 | Fritz et al. | |
| 5,313,694 A | 5/1994 | Yonemoto et al. | |
| 6,039,634 A * | 3/2000 | Bach et al. | 451/49 |
| 6,053,676 A | 4/2000 | Garschagen et al. | |
| 6,202,521 B1 | 3/2001 | Rossetti et al. | |
| 6,760,961 B2 | 7/2004 | Upadhya | |
| 6,761,096 B1 | 7/2004 | Kochsiek | |
| 7,156,006 B2 | 1/2007 | Hyatt et al. | |
| 2003/0209394 A1 | 11/2003 | Carlson | |

FOREIGN PATENT DOCUMENTS

| | | |
|---|---|---|
| DE | 3532558 | 3/1987 |
| DE | 3826159 | 2/1990 |
| DE | 3826159 A1 * | 2/1990 |
| DE | 4124538 | 10/1992 |
| GB | 775715 | 5/1957 |
| GB | 2057939 | 4/1981 |
| WO | 03095861 | 11/2003 |

OTHER PUBLICATIONS

International Preliminary Report on Patentabilty, dated Mar. 26, 2009, PCT/US2007/078176.
International Search Report and Written Opinion of the International Searching Authority dated Jan. 25, 2008.

* cited by examiner

*Primary Examiner* — Will Fridie, Jr.
(74) *Attorney, Agent, or Firm* — Miller, Matthias & Hull LLP

(57) ABSTRACT

Disclosed are a method and apparatus in the field of computer numerically controlled machine tools. A rotating workpiece is brought into contact with a tool, the tool being disposed in a rotating tool holder and traversing an eccentric path. By rotating the tool holder and workpiece synchronously, various characteristics forms may be produced. The method in some embodiments is useful in the turning of noncircular shapes, such as ovoid pistons and other parts.

10 Claims, 15 Drawing Sheets

Fig. 17
Fig. 18
Fig. 19
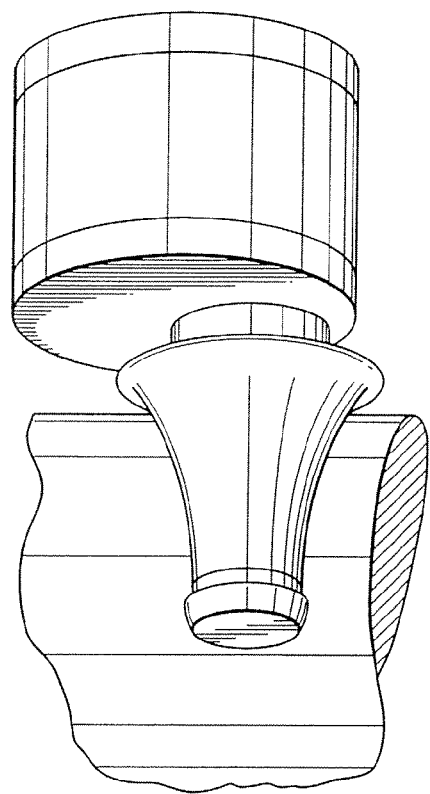
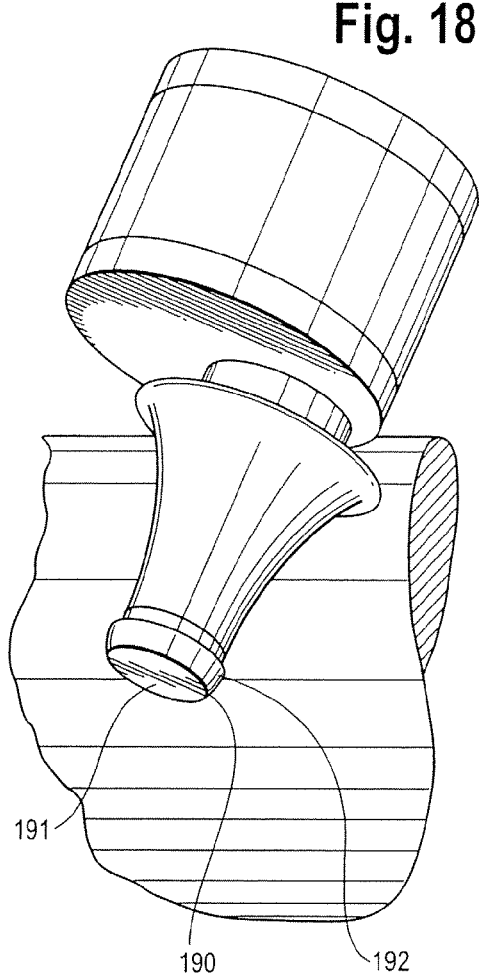
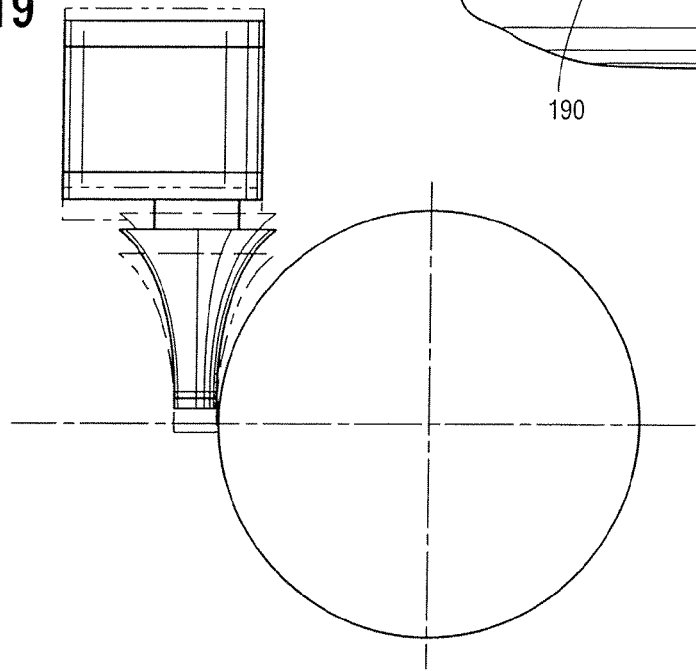

TURNING METHOD AND APPARATUS

TECHNICAL FIELD

The invention is in the field of computer numerically controlled machines and related methods.

BACKGROUND

Lathes have long been used to turn metal and wooden parts. In a lathe, the lathe spindle retains the workpiece via a workpiece holder mounted thereon. The workpiece holder is cause to rotate, and a cutting tool is brought into contact with the rotating workpiece to cause removal of material from the workpiece. The resulting form is symmetric about its axis of rotation.

In many cases, it is desired to produce forms that are not symmetric about an axis of rotation. For example, automotive pistons typically are designed to have ovoid or elliptical forms. It can be difficult to produce pistons and other parts having an ovoid shape on a lathe, and it can be difficult to produce other complex shapes on a lathe. Conventionally, in many embodiments such forms either may be milled or otherwise machined, or turned on specialized lathes. Various approaches are purportedly described in U.S. Pat. Nos. 5,313,694, 6,202,521 and 6,760,961, and U.S. Patent Publication Serial No. US2003/0209394.

SUMMARY

The invention provides in some embodiments a method that differs from the heretofore described prior patents and publication, and in other embodiments an apparatus that differs from the heretofore described prior patents and publication. In one embodiment, a method comprises providing a rotating workpiece and bringing a tool into contact with the workpiece to thereby cause material to be removed from the workpiece. The tool is offset from the rotational axis of the tool holder to thereby create eccentric rotation of said tool. In other embodiments, the invention provides an apparatus that comprises a computer control system having a computer readable medium with computer executable code disposed thereon and being operatively coupled to a tool holder and to a workpiece holder. The code comprises code for causing rotation of the tool holder, the tool holder being configured for eccentric rotation.

In some embodiments, the apparatus and method described herein may be used to turn noncircular shapes, such as ovoid or elliptical shapes. In some (but not necessarily all) such embodiments, it is believed that the invention may provide certain processing advantages, in particular enhanced speed and tool life. Neither the foregoing summary nor the remaining descriptions are intended to be limiting.

BRIEF DESCRIPTION OF THE FIGURES

FIG. 17 is a perspective view of a tool holder and tool assembly as it is brought into contact with a workpiece in another embodiment of the invention.

FIG. 18 is a perspective view of a tool holder and tool assembly as it is brought into contact with a workpiece in another embodiment of the invention.

FIG. 19 is a perspective view of a tool holder and tool assembly illustrated in FIG. 17, showing in phantom a range of obliqueness in the X-direction.

DETAILED DESCRIPTION

Any suitable apparatus may be employed in conjunction with the methods of invention. In some embodiments, the methods are performed using a computer numerically controlled machine, illustrated generally in FIGS. 1-9. A computer numerically controlled machine is itself provided in other embodiments of the invention. The machine 100 illustrated in FIGS. 1-9 is an NT-series machine, versions of which are available from Mori Seiki USA, Inc., the assignee of the present application. Other suitable computer numerically controlled machines include the NL-series machines with turret (not shown), also available from Mori Seiki USA, Inc. Other machines may be used in conjunction with the invention.

Figure 1:
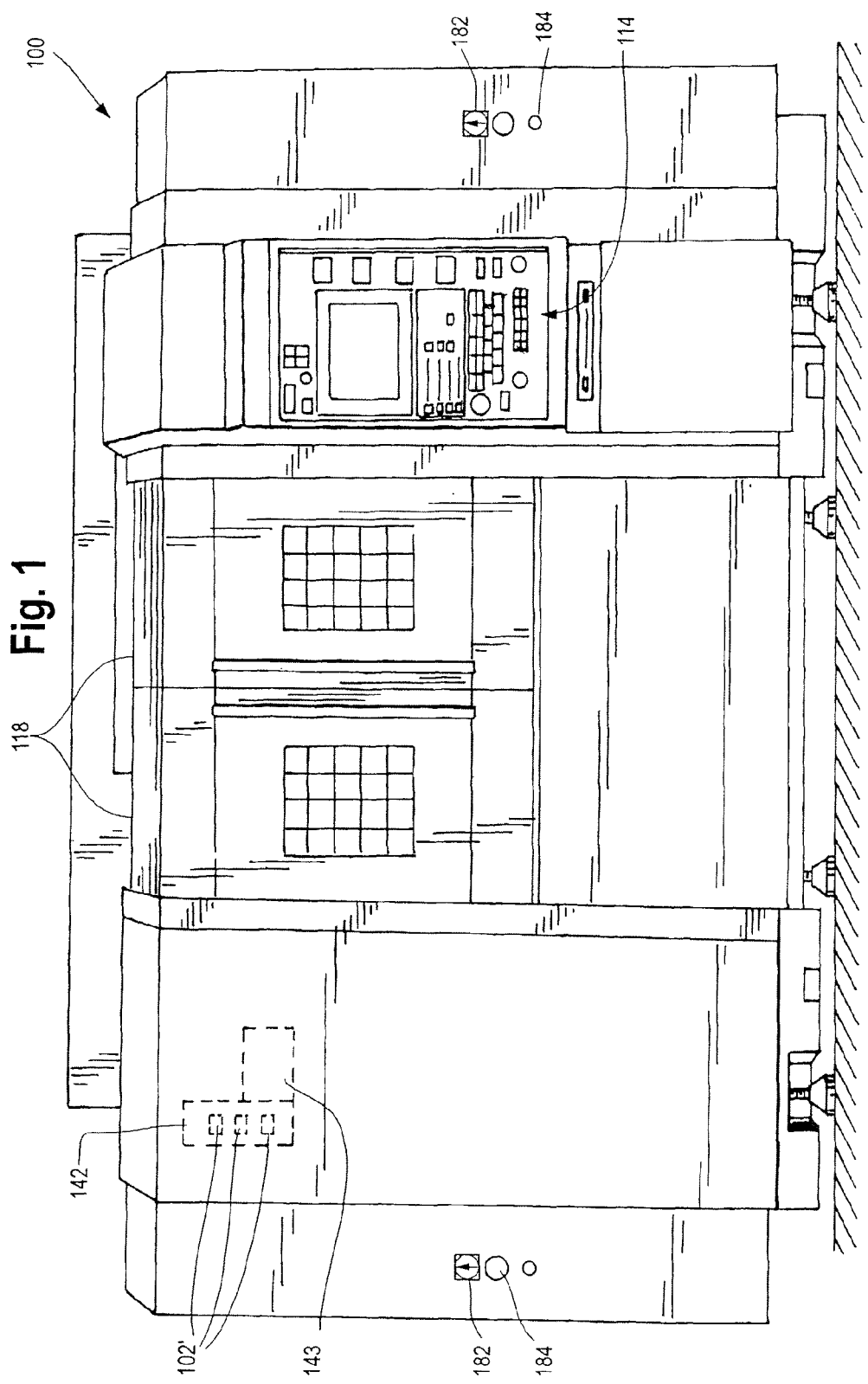
FIG. 1 is a front elevation of a computer numerically controlled machine in accordance with one embodiment of the present invention, shown with safety doors closed.
Figure 2:
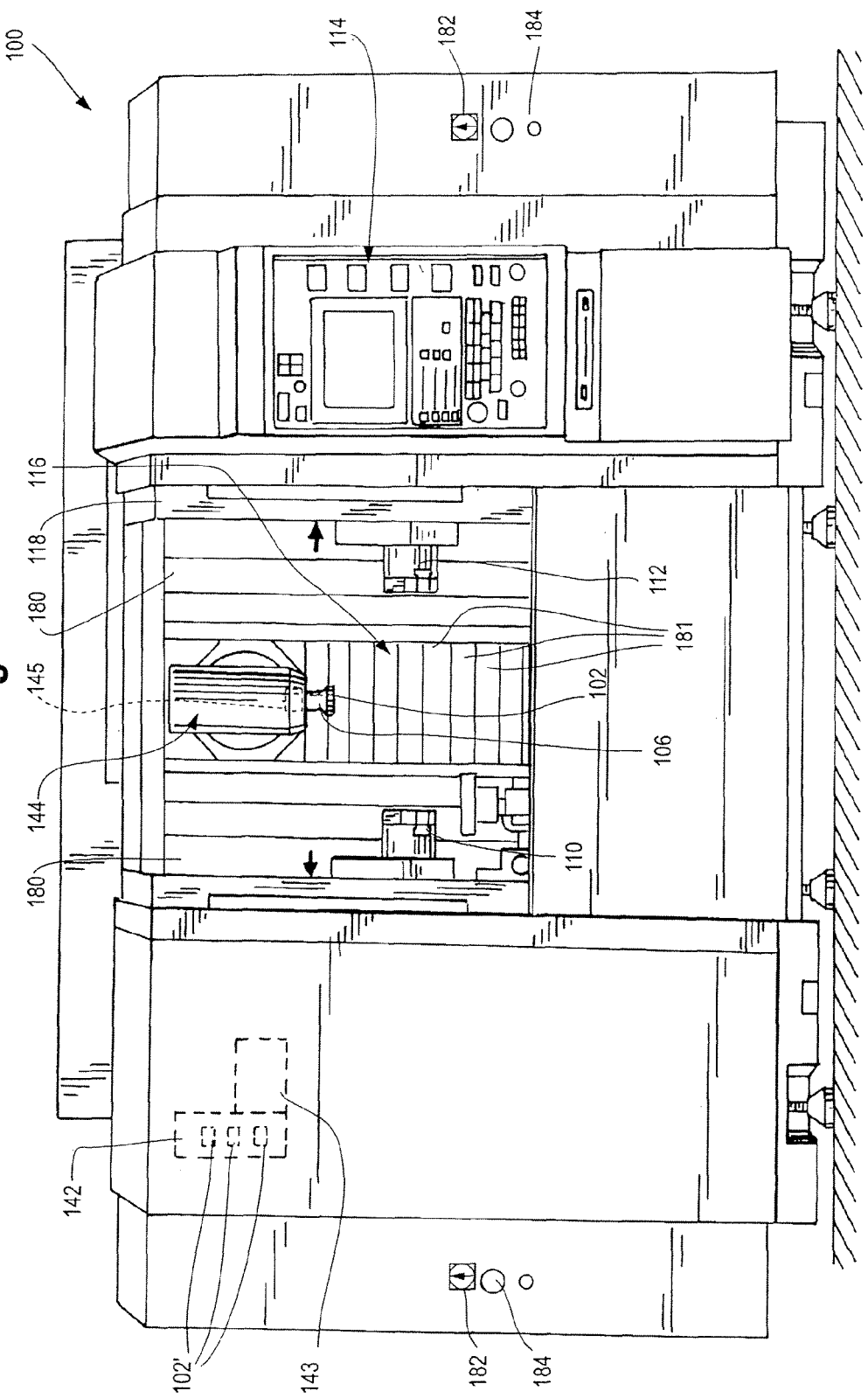
FIG. 2 is a front elevation of a computer numerically controlled machine illustrated in FIG. 1, shown with the safety doors open.
Figure 3:
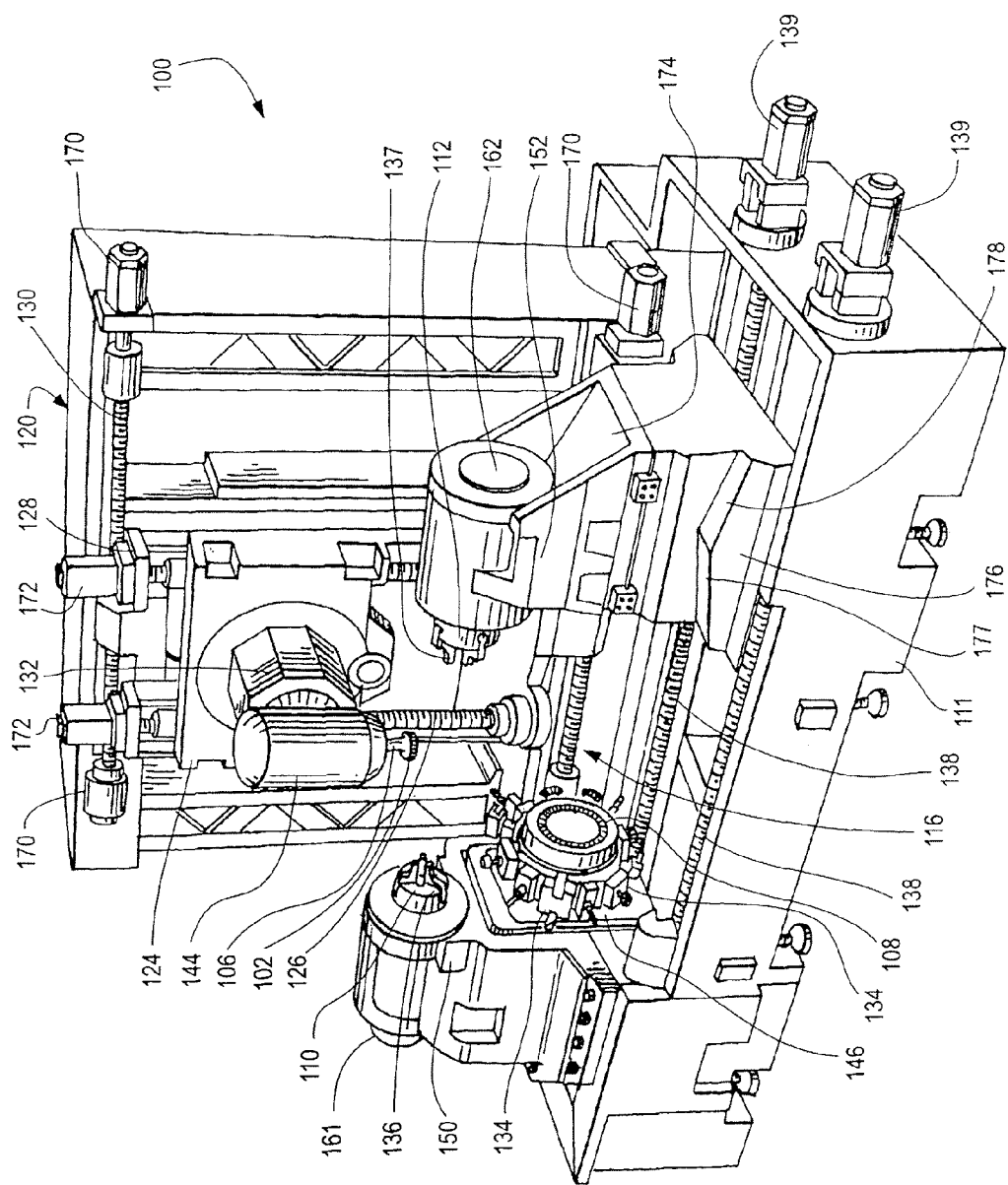
FIG. 3 is a perspective view of certain interior components of the computer numerically controlled machine illustrated in FIGS. 1 and 2, depicting a machining spindle, a first chuck, a second chuck, and a turret.

In general, with reference to the NT-series machine illustrated in FIGS. 1-3, one suitable computer numerically controlled machine 100 has at least a first retainer and a second retainer, each of which may be one of a spindle retainer associated with spindle 144, a turret retainer associated with a turret 108, or a chuck 110, 112. In the embodiment illustrated in the Figures, the computer numerically controlled machine 100 is provided with a spindle 144, a turret 108, a first chuck 110, and a second chuck 112. The computer numerically controlled machine 100 also has a computer control system operatively coupled to the first retainer and to the second retainer for controlling the retainers, as described in more detail below. It is understood that in some embodiments, the computer numerically controlled machine 100 may not contain all of the above components, and in other embodiments, the computer numerically controlled machine 100 may contain additional components beyond those designated herein.

As shown in FIGS. 1 and 2, the computer numerically controlled machine 100 has a machine chamber 116 in which various operations generally take place upon a workpiece (not shown). Each of the spindle 144, the turret 108, the first chuck 110, and the second chuck 112 may be completely or partially located within the machine chamber 116. In the embodiment shown, two moveable safety doors 118 separate the user from the chamber 116 to prevent injury to the user or interference in the operation of the computer numerically controlled machine 100. The safety doors 118 can be opened to permit access to the chamber 116 as illustrated in FIG. 2. The computer numerically controlled machine 100 is described herein with respect to three orthogonally oriented linear axis (X, Y, and Z), depicted in FIG. 4 and described in greater detail below. Rotational axis about the X, Y and Z axis are connoted "A," "B," and "C" rotational axis respectively.

The computer numerically controlled machine 100 is provided with a computer control system for controlling the various instrumentalities within the computer numerically controlled machine. In the illustrated embodiment, the machine is provided with two interlinked computer systems, a first computer system comprising a user interface system (shown generally at 114 in FIG. 1) and a second computer system (not illustrated) operatively connected to the first computer system. The second computer system directly controls the operations of the spindle, the turret, and the other instrumentalities of the machine, while the user interface system 114 allows an operator to control the second computer system. Collectively, the machine control system and the user interface system, together with the various mechanisms for control of operations in the machine, may be considered a single computer control system. In some embodiments, the user operates the user interface system to impart programming to the machine; in other embodiments, programs can be loaded or transferred into the machine via external sources. It is contemplated, for instance, that programs may be loaded via a PCMCIA interface, an RS-232 interface, a universal serial bus interface (USB), or a network interface, in particular a TCP/IP network interface. In other embodiments, a machine may be controlled via conventional PLC (programmable logic controller) mechanisms (not illustrated).

As further illustrated in FIGS. 1 and 2, the computer numerically computer controlled machine 100 may have a tool magazine 142 and a tool changing device 143. These cooperate with the spindle 144 to permit the spindle to operate with plural cutting tools (shown in FIG. 1 as tools 102'). Generally, a variety of cutting tools may be provided; in some embodiments, plural tools of the same type may be provided.

The spindle 144 is mounted on a carriage assembly 120 that allows for translational movement along the X- and Z-axis, and on a ram 132 that allows the spindle 144 to be moved in the Y-axis. The ram 132 is equipped with a motor to allow rotation of the spindle in the B-axis, as set forth in more detail hereinbelow. As illustrated, the carriage assembly has a first carriage 124 that rides along two threaded vertical rails (one rail shown at 126) to cause the first carriage 124 and spindle 144 to translate in the X-axis. The carriage assembly also includes a second carriage 128 that rides along two horizontally disposed threaded rails (one shown in FIG. 3 at 130) to allow movement of the second carriage 128 and spindle 144 in the Z-axis. Each carriage 124, 128 engages the rails via plural ball screw devices whereby rotation of the rails 126, 130 causes translation of the carriage in the X- or Z-direction respectively. The rails are equipped with motors 170 and 172 for the horizontally disposed and vertically disposed rails respectively.

The spindle 144 holds the cutting tool 102 by way of a spindle connection and a tool holder 106. The spindle connection 145 (shown in FIG. 2) is connected to the spindle 144 and is contained within the spindle 144. The tool holder 106 is connected to the spindle connection and holds the cutting tool 102. Various types of spindle connections are known in the art and can be used with the computer numerically controlled machine 100. Typically, the spindle connection is contained within the spindle 144 for the life of the spindle. An access plate 122 for the spindle 144 is shown in FIGS. 5 and 6.

The first chuck 110 is provided with jaws 136 and is disposed in a stock 150 that is stationary with respect to the base 111 of the computer numerically controlled machine 110. The second chuck 112 is also provided with jaws 137, but the second chuck 112 is movable with respect to the base 111 of the computer numerically controlled machine 100. More specifically, the machine 100 is provided with threaded rails 138 and motors 139 for causing translation in the Z-direction of the second stock 152 via a ball screw mechanism as heretofore described. To assist in swarf removal, the stock 152 is provided with a sloped distal surface 174 and a side frame 176 with Z-sloped surfaces 177, 178. Hydraulic controls and associated indicators for the chucks 110, 112 may be provided, such as the pressure gauges 182 and control knobs 184 shown in FIGS. 1 and 2. Each stock is provided with a motor (161, 162 respectively) for causing rotation of the chuck.

Figure 5:
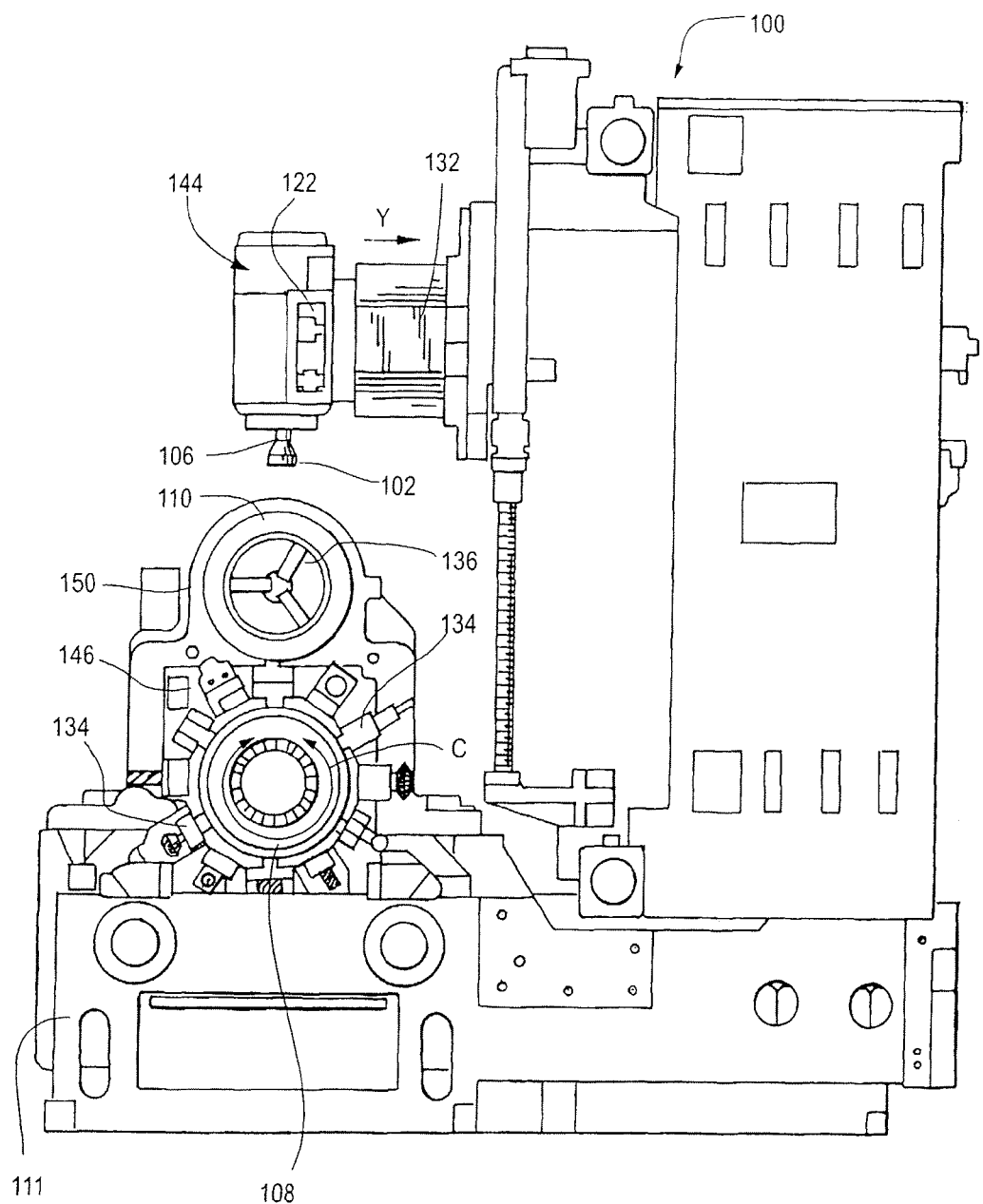
FIG. 5 is a side view of the first chuck, machining spindle, and turret of the machining center illustrated in FIG. 1.
Figure 6:
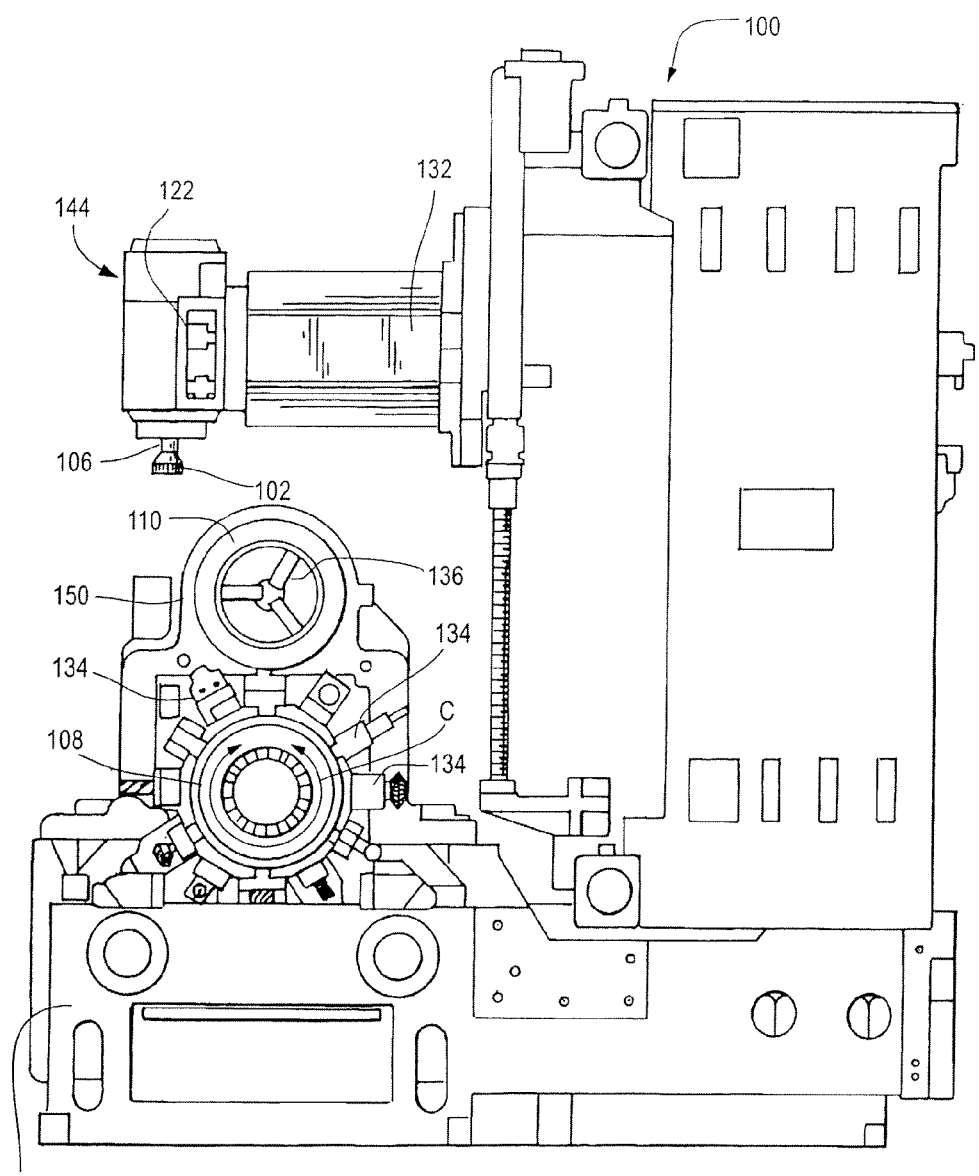
FIG. 6 is a view similar to FIG. 5 but in which a machining spindle has been translated in the Y-axis.
Figure 9:
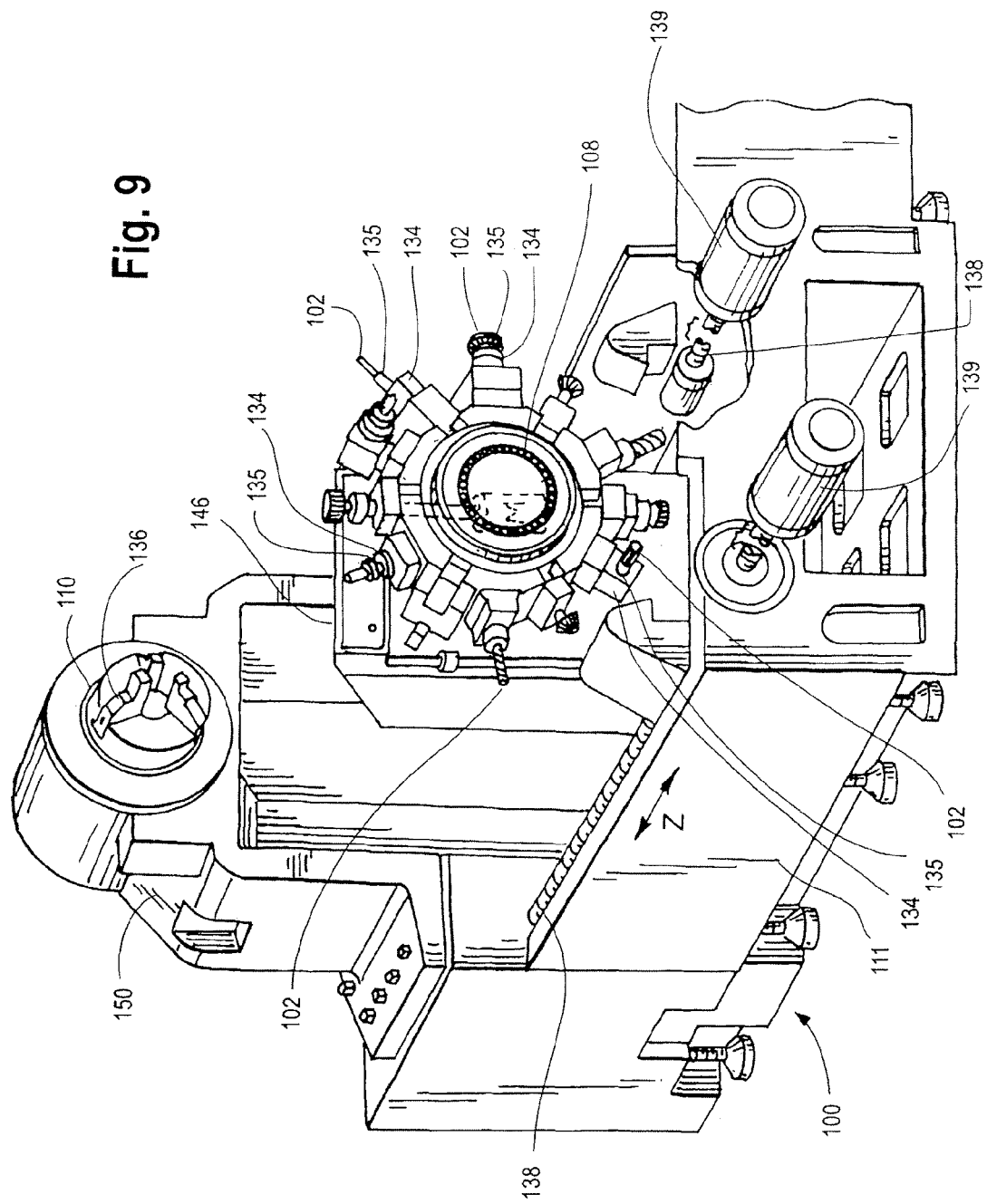
FIG. 9 is a perspective view of the first chuck and turret illustrated in FIG. 2, depicting movement of the turret and turret stock in the Z-axis relative to the position of the turret in FIG. 2.

The turret 108, which is best depicted in FIGS. 5, 6 and 9, is mounted in a turret stock 146 (FIG. 5) that also engages rails 138 and that may be translated in a Z-direction, again via ball-screw devices. The turret 108 is provided with various turret connectors 134, as illustrated in FIG. 9. Each turret connector 134 can be connected to a tool holder 135 or other connection for connecting to a cutting tool. Since the turret 108 can have a variety of turret connectors 134 and tool holders 135, a variety of different cutting tools can be held and operated by the turret 108. The turret 108 may be rotated in a C' axis to present different ones of the tool holders (and hence, in many embodiments, different tools) to a workpiece.

Figure 4:
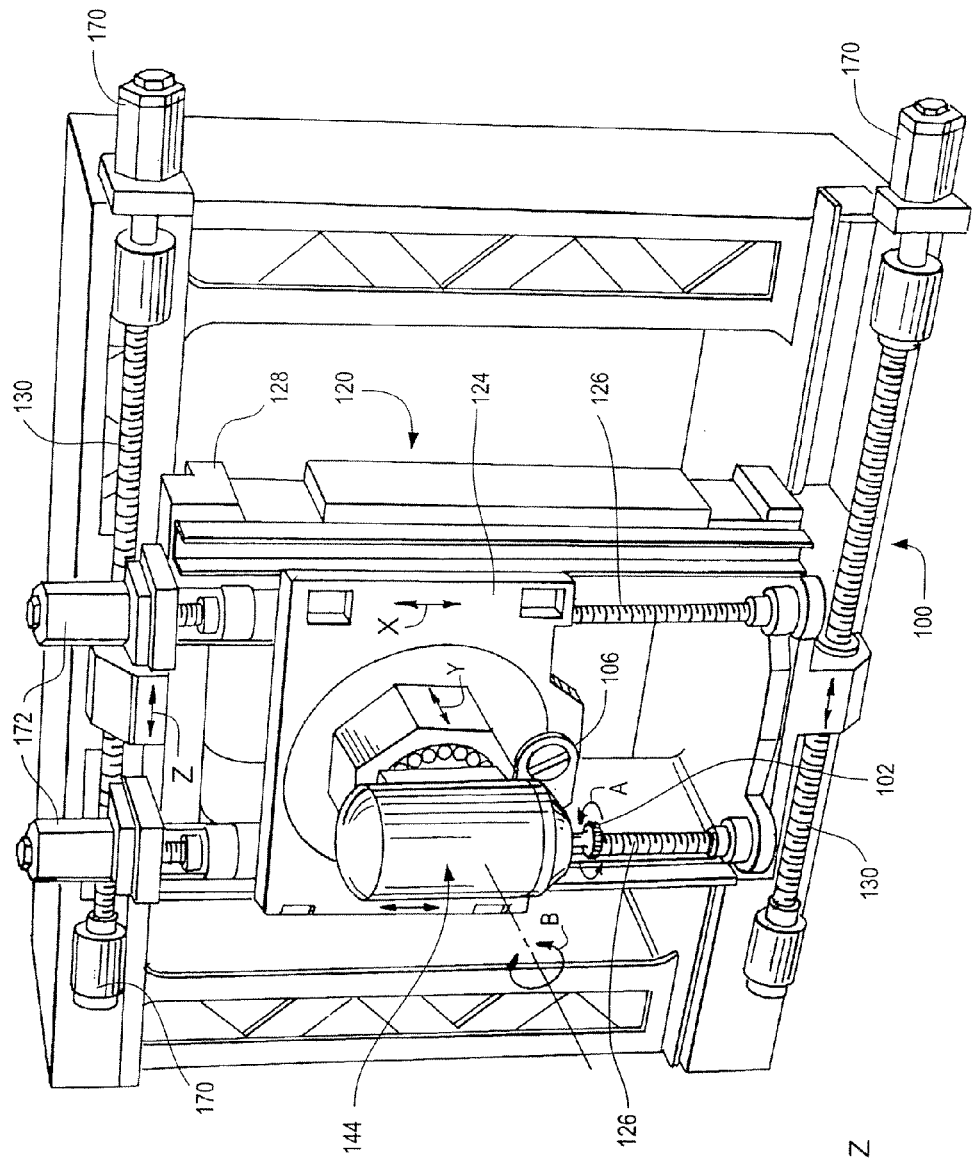
FIG. 4 a perspective view, enlarged with respect to FIG. 3 illustrating the machining spindle and the horizontally and vertically disposed rails via which the spindle may be translated.
Figure 7:
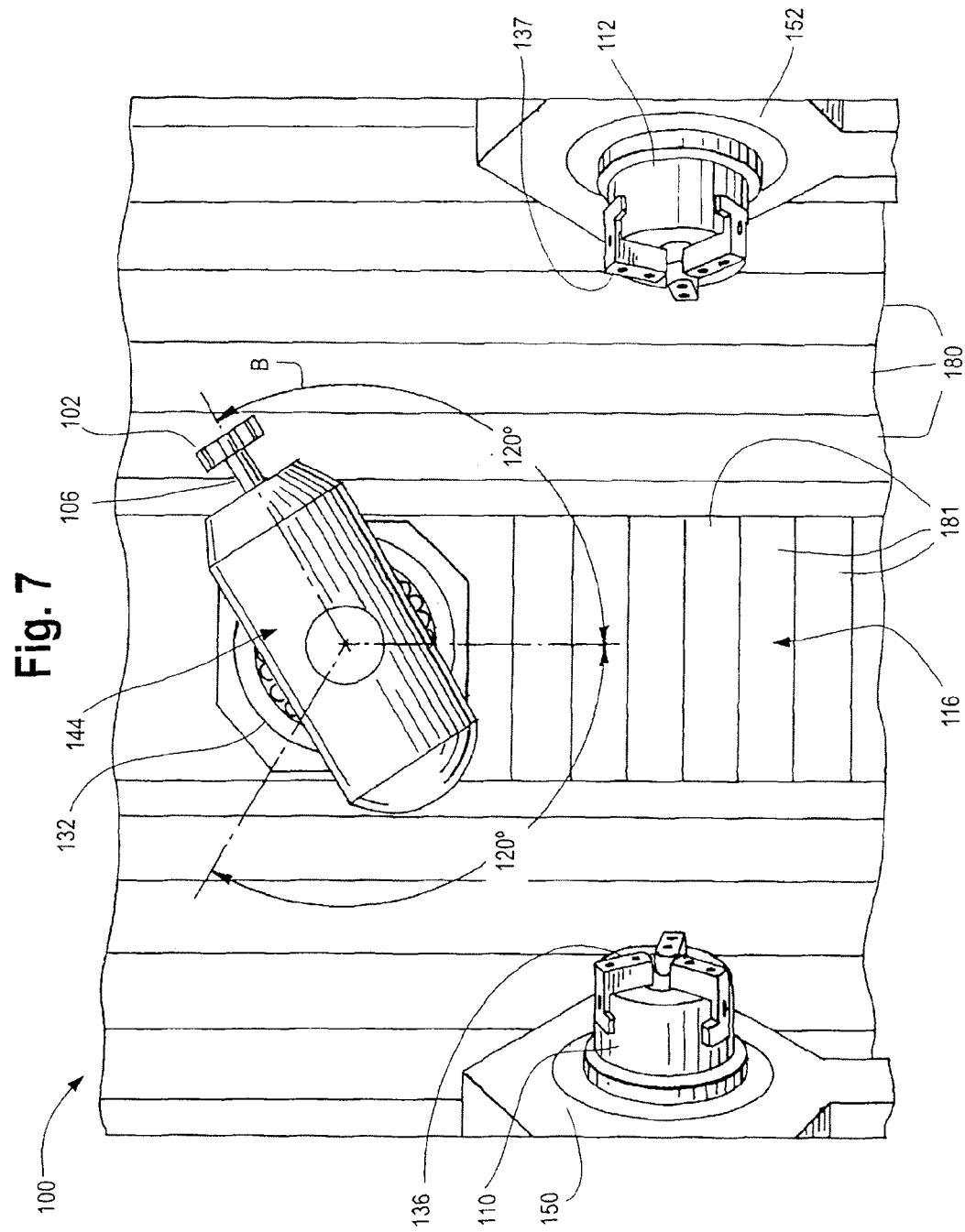
FIG. 7 is a front view of the spindle, first chuck, and second chuck of the computer numerically controlled machine illustrated in FIG. 1, including a line depicting the permitted path of rotational movement of this spindle.
Figure 8:
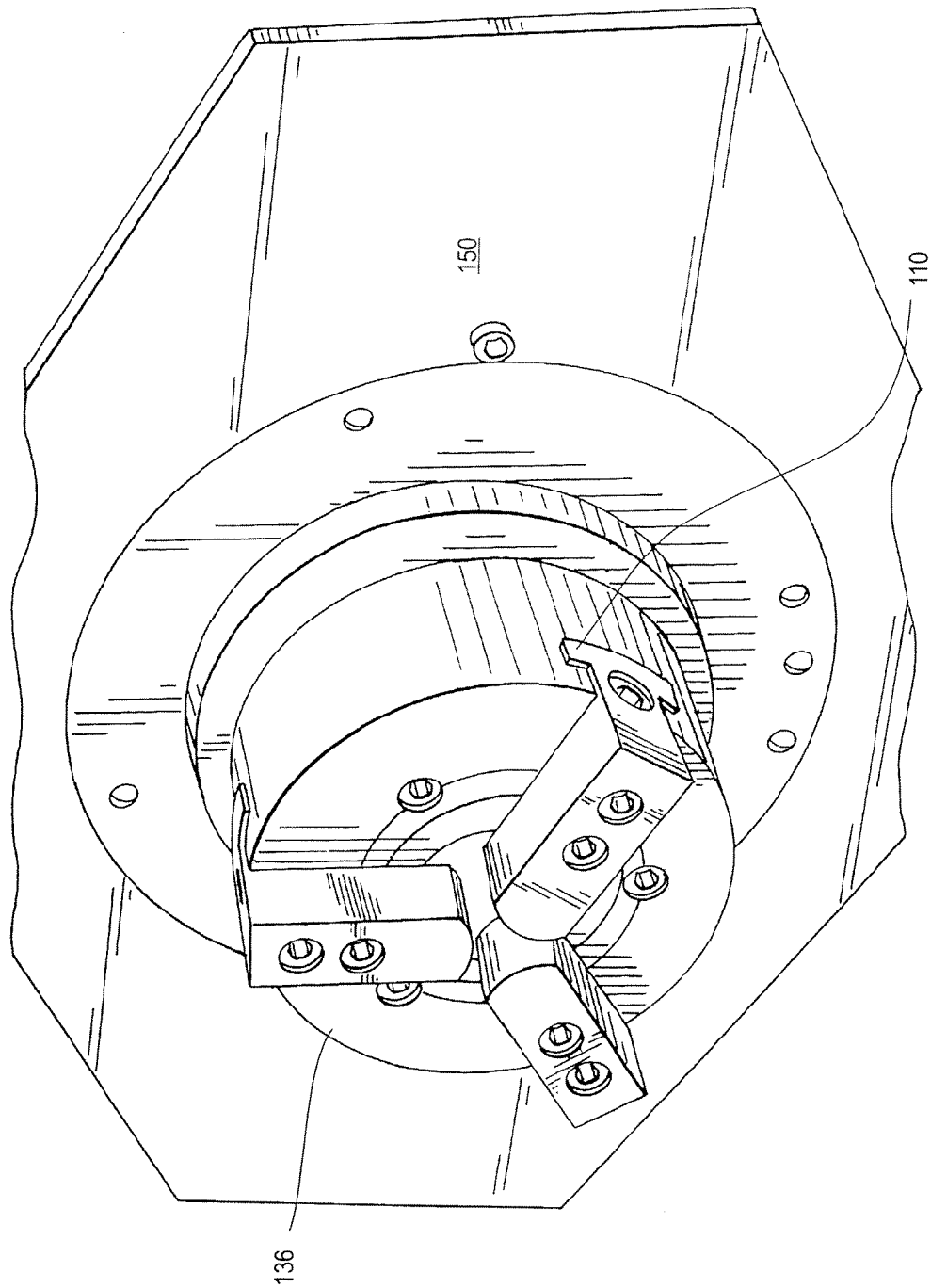
FIG. 8 is a perspective view of the second chuck illustrated in FIG. 3, enlarged with respect to FIG. 3.

It is thus seen that a wide range of versatile operations may be performed. With reference to tool 102 held in tool holder 106, such tool 102 may be brought to bear against a workpiece (not shown) held by one or both of chucks 110, 112. When it is necessary or desirable to change the tool 102, a replacement tool 102 may be retrieved from the tool magazine 142 by means of the tool changing device 143. With reference to FIGS. 4 and 5, the spindle 144 may be translated in the X and Z directions (shown in FIG. 4) and Y direction (shown in FIGS. 5 and 6). Rotation in the B axis is depicted in FIG. 7, the illustrated embodiment permitting rotation within a range of 120° to either side of the vertical. Movement in the Y direction and rotation in the B axis are powered by motors (not shown) that are located behind the carriage 124. Generally, as seen in FIGS. 2 and 7, the machine is provided with a plurality of vertically disposed leaves 180 and horizontal disposed leaves 181 to define a wall of the chamber 116 and to prevent swarf from exiting this chamber.

The components of the machine 100 are not limited to the heretofore described components. For instance, in some instances an additional turret may be provided. In other instances, additional chucks and/or spindles may be provided. Generally, the machine is provided with one or more mechanisms for introducing a cooling liquid into the chamber 116.

In the illustrated embodiment, the computer numerically controlled machine 100 is provided with numerous retainers. Chuck 110 in combination with jaws 136 forms a retainer, as does chuck 112 in combination with jaws 137. In many instances these retainers will also be used to hold a workpiece. For instance, the chucks and associated stocks will function in a lathe-like manner as the headstock and optional tailstock for a rotating workpiece. Spindle 144 and spindle connection 145 form another retainer. Similarly, the turret 108, when equipped with plural turret connectors 134, provides a plurality of retainers (shown in FIG. 9).

The computer numerically controlled machine 100 may use any of a number of different types of cutting tools known in the art or otherwise found to be suitable. For instance, the cutting tool 102 may be a milling tool, a drilling tool, a grinding tool, a blade tool, a broaching tool, a turning tool, or any other type of cutting tool deemed appropriate in connection with a computer numerically controlled machine 100. As discussed above, the computer numerically controlled machine 100 may be provided with more than one type of cutting tool, and via the mechanisms of the tool changing device 143 and magazine 142, the spindle 144 may be caused to exchange one tool for another. Similarly, the turret 108 may be provided with one or more cutting tools 102, and the operator may switch between cutting tools 102 by causing rotation of the turret 108 to bring a new turret connector 134 into the appropriate position.

Other features of a computer numerically controlled machine include, for instance, an air blower for clearance and removal of chips, various cameras, tool calibrating devices, probes, probe receivers, and lighting features. The computer numerically controlled machine illustrated in FIGS. 1-9 is not the only machine of the invention, but to the contrary, other embodiments are envisioned.

Figure 10:
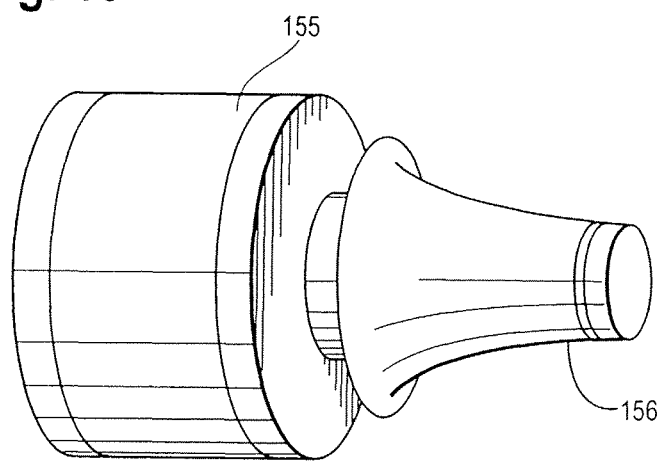
FIG. 10 is a side elevational view of a tool holder and tool assembly useful in conjunction with certain embodiments of the invention.
Figure 11:
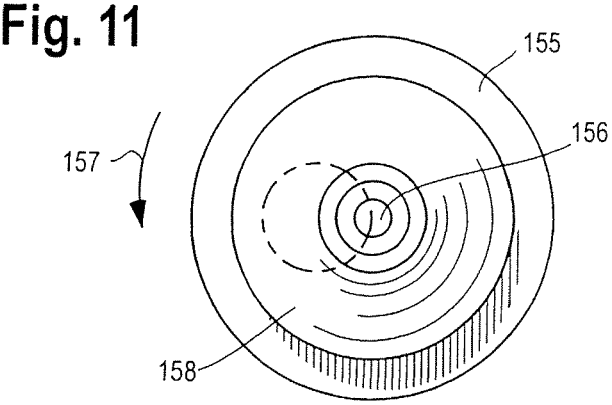
FIG. 11 is a front view of the tool holder and tool assembly illustrated in FIG. 10.

The various retainers may serve as tool or workpiece holders in accordance with the present invention. As shown, for instance, in FIG. 10, the tool holder 155 may comprise a holder in the nature of an adjustable boring bar holder. The tool 156, which may be any suitable tool, is disposed in the tool holder 155 in a manner that permits the tool 156 to be offset from the center of rotation of the boring bar, as best seen in FIG. 11 with respect to rotation 157 of the tool holder 155 and rotation 158 of the tool 156. The rotation of the tool is thereby caused to be eccentric. The invention is not limited to the use of an adjustable boring bar, but to the contrary it is envisioned that other tool holders and configurations may be possible.

Figure 12:
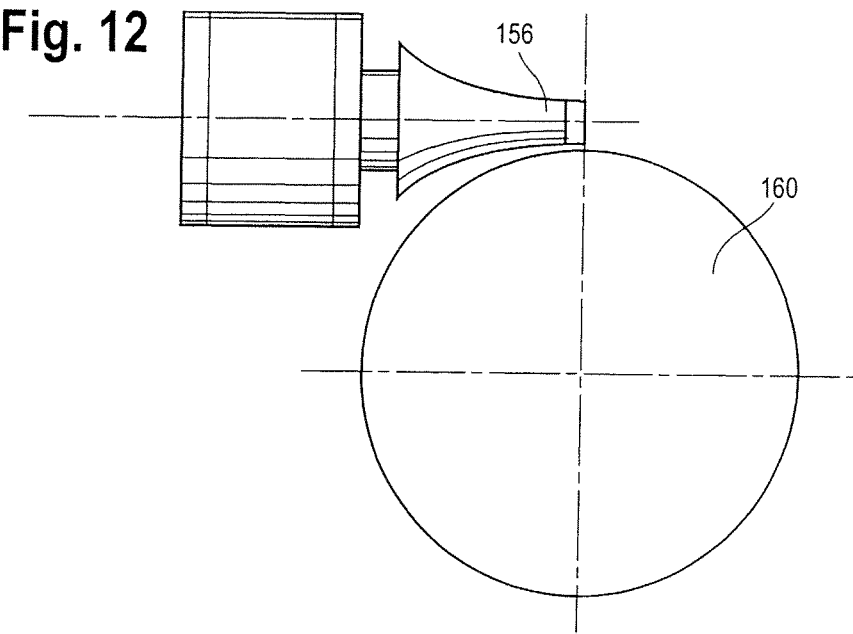
FIG. 12 is a view taken along the Z-axis illustrating the tool as it is brought into contact with a workpiece in accordance with one embodiment of the invention.

As shown, for instance, in FIG. 12, the tool is brought into contact with a workpiece 160 whereby material is removed from the workpiece. Both the tool holder 155 and workpiece 160 are rotated. In accordance with some embodiments of the invention, the rotation of the tool holder and tool are synchronous. In accordance with the present invention, and without intending to limit or affect the scope of this term as it may be used in other pending applications, synchronous rotation connotes rotation of the tool holder at a speed (revolutions per time) that is equal to or that is an integer multiple of that of the workpiece. In practice, the rotation may be synchronous within the limits of the machine, or may be synchronous to within any other desired range of tolerance. In some embodiments of the invention, the rotation of the tool holder and workpiece is not synchronous. Generally, the ratio of rotational speeds of the tool:workpiece can be expressed as 1:n, where n can be any suitable integer, fraction, or other suitable value.

Figure 13:
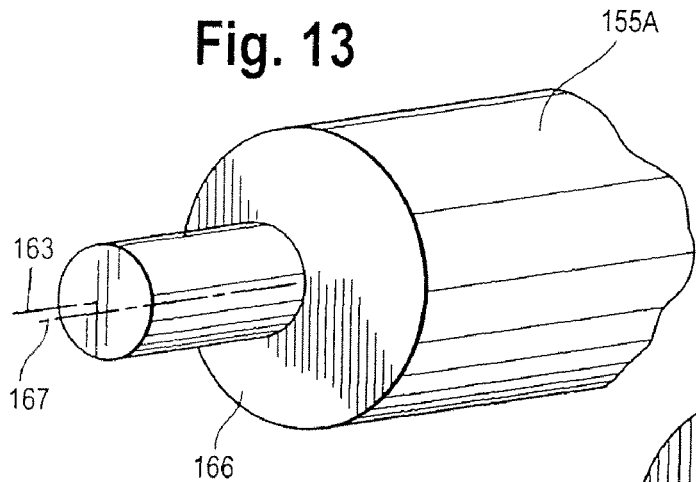
FIG. 13 is a perspective view of a characteristic turned form yielded upon synchronous rotation at a relative rotational speed of 1:1.
Figure 14:
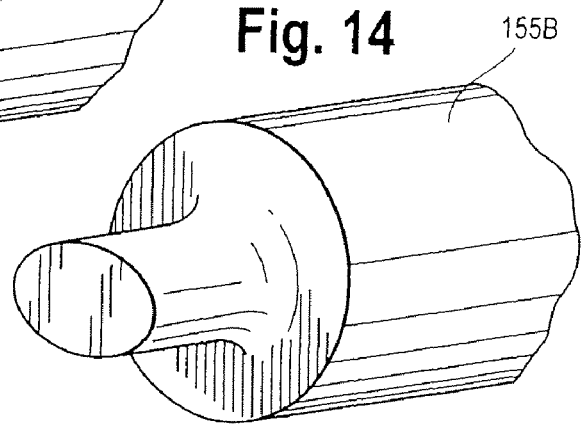
FIG. 14 is a perspective view of a characteristic turned form yielded upon synchronous rotation at a relative rotational speed of 2:1.
Figure 15:
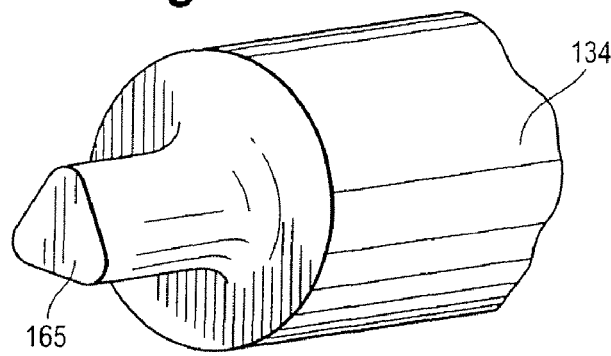
FIG. 15 is a perspective view of a characteristic turned form yielded upon synchronous rotation at a relative rotational speed of 3:1.
Figure 16:
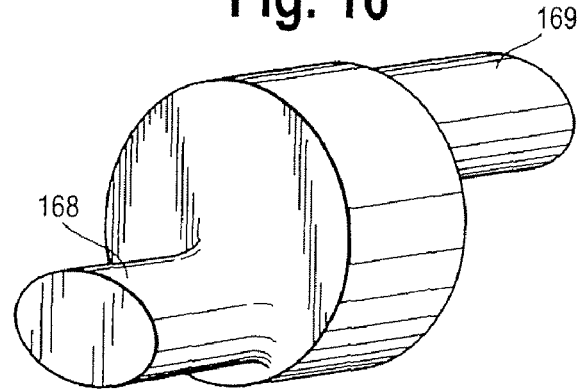
FIG. 16 is a perspective view of an exemplary part that may be prepared in accordance with one embodiment of the invention.

Synchronous rotation of the tool holder and workpiece allows various characteristic turned forms to be prepared. For instance, as shown in FIG. 13, a rotational ratio of 1:1 yields form 166, which comprises a generally cylindrical form having an axis 163 that is offset from the axis of rotation 167 of the workpiece 155A. In FIG. 14, synchronous rotation of the tool and workpiece at a rotational ratio of 2:1 yields an ovoid form 164 on workpiece 155B. This embodiment is useful in the preparation of engine pistons. Relative rotation at a ratio 3:1 generally yields a trilobe form 165 on workpiece 155C, as illustrated in FIG. 15. It is contemplated that other non circular forms, or other forms that are asymmetric about the central axis of rotation of the workpiece, may be prepared. For instance, it is contemplated that a form similar to that shown in FIG. 16 may be prepared. The form including two projections 168, 169 yielded by turning opposite ends of a rotating workpiece.

The tool holder and workpiece may be oriented with respect to one another in any desired manner. For instance, the tool holder may rotate about an axis that is generally perpendicular to a plane that intersects the axis of rotation of the workpiece and the point of contact of the workpiece and the tool, as illustrated in FIGS. 12 and 17. Alternatively, the tool holder may rotate about an axis that is oblique to a plane that intersects the axis of rotation of the workpiece and the point of contact of the workpiece and the tool. The obliqueness may have a Z-axis component, as illustrated in FIG. 18. In such embodiments, the degree of offset from the perpendicular may be any amount deemed or found to be suitable for use in preparing turned forms; generally, a degree of offset of up to about 45° often may be suitable. Likewise, as illustrated in FIG. 19, the obliqueness may have an X- or Y-axis component. In such embodiments, the degree of offset from the perpendicular may be any amount deemed or found to be suitable for use in preparing turned forms; generally, a degree of offset of up to about 15° often may be suitable. These embodiments are not mutually exclusive, and the tool and workpiece may be oblique in multiple axis.

In the heretofore illustrated embodiments, the tool comprises a first surface, a second surface, at least one side therebetween, and a cutting edge at the intersection of the at least one side and the first surface, as illustrated, for instance, in FIG. 18 with reference to cutting edge 190, first surface 191 and side surface 192. Other tools may be employed, however.

Figure 20:
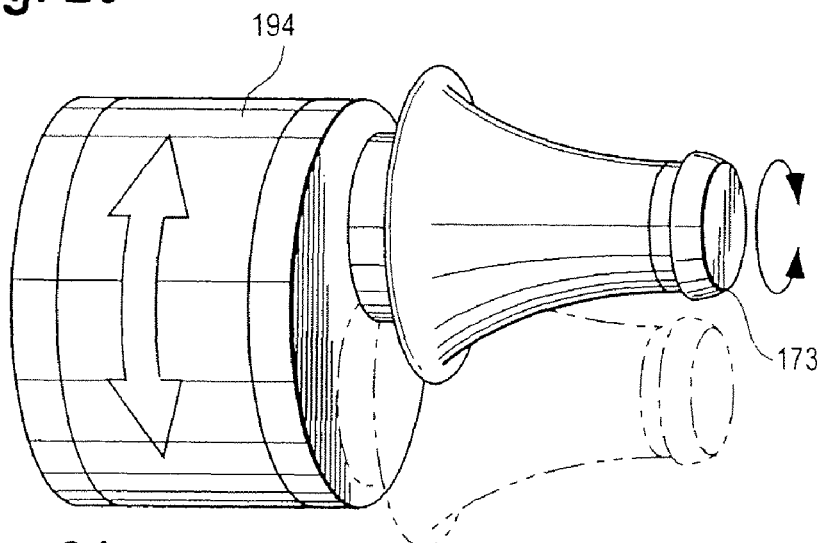
FIG. 20 is a perspective view of an alternative tool holder and tool useful in conjunction with the invention.
Figure 21:
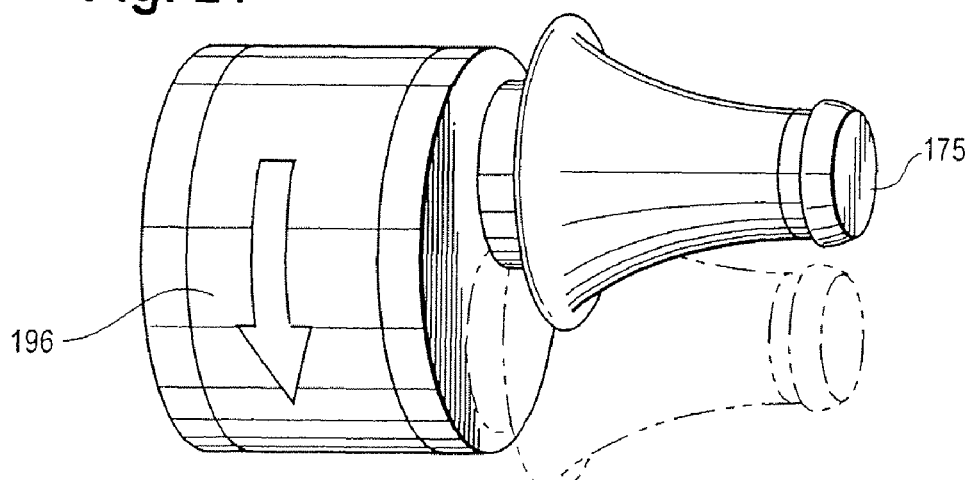
FIG. 21 is a perspective view of an alternative tool holder and tool useful in conjunction with the invention.
Figure 22:
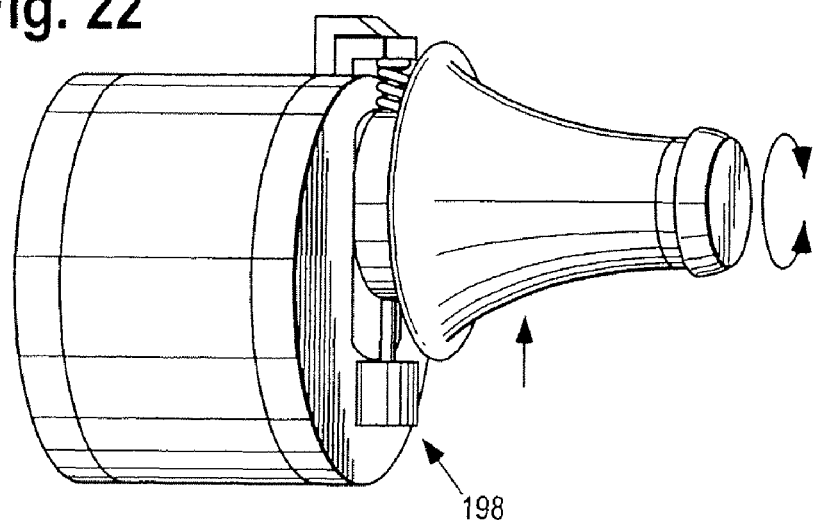
FIG. 22 is a perspective view of an alternative tool holder and tool useful in conjunction with the invention.

Likewise, in the heretofore described embodiments, the tool is fixed relative to the tool holder, but other configurations are possible. For instance, as shown in FIG. 20, the tool 173 may rotate about its own axis as the tool holder 194 rotates. The rotation may be independent of the rotation of the tool holder. Alternatively, as illustrated in FIG. 21, the rotation of the tool 175 may be synchronous with that of the tool holder 196. Other embodiments for causing eccentric tool rotation are possible. For instance, as illustrated in FIG. 22, the illustrated piston and spring mechanism 198 may be employed to cause eccentric rotation of the tool. Other pneumatic or hydraulic or other actuation mechanisms are possible.

Figure 23:
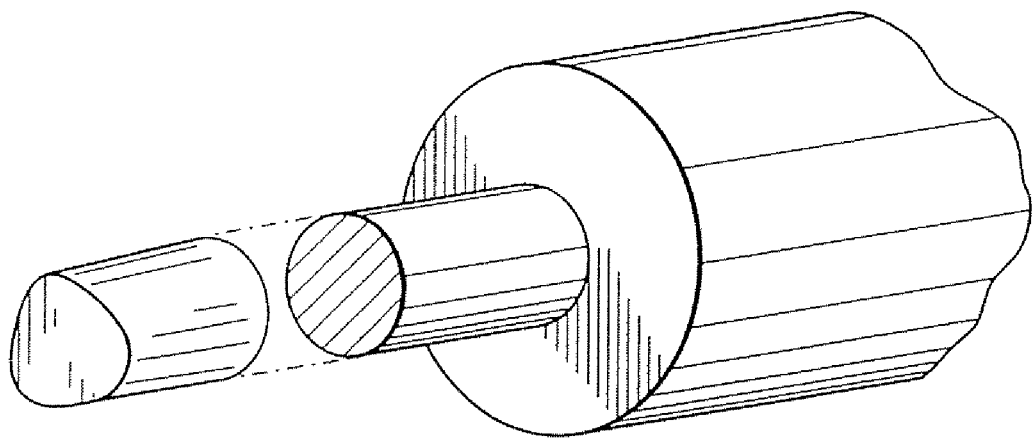
FIG. 23 is a perspective view of a turned form prepared by varying the degree of offset of a tool from the centerline of the rotating tool holder.
Figure 24:
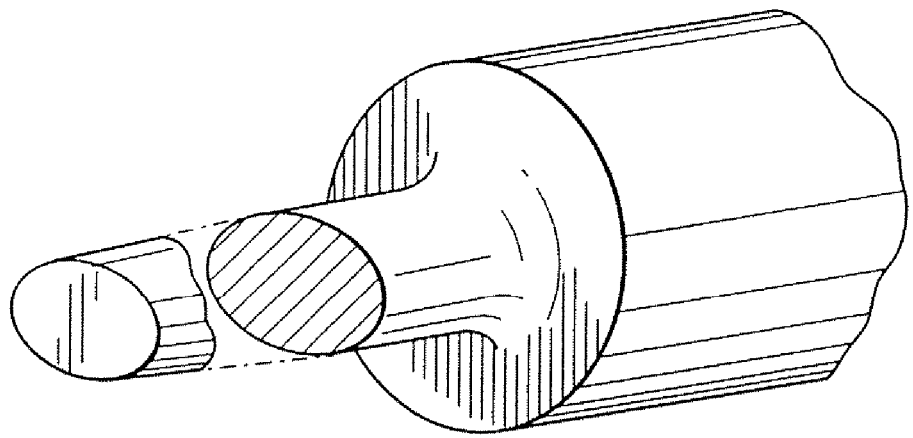
FIG. 24 is a perspective view of a part prepared by varying the relative rotational speed of the tool holder and tool during a turning operation.

Other turned forms besides those theretofore described may be prepared. For instance, as illustrated in FIG. 23, the degree of relative rotation of the tool holder and workpiece has been varied from 3:1 to 2:1 as the workpiece has been fed to the tool. In FIG. 24, the degree of offset of the tool relative to the tool holder central axis has been varied as the workpiece has been fed. These illustrations are not intended to be limiting, but to the contrary, it is contemplated that other turned forms may be compared in accordance with the invention.

In some embodiments, the invention contemplates an apparatus, such as the apparatus illustrated above. Generally, the apparatus includes a computer controlled system that includes a computer readable medium having computer executable code disposed thereon. The control system is operatively coupled to the tool holder and to the workpiece holder. The code comprises code for causing rotation of the tool holder and for causing relative movement of the tool holder and workpiece in a direction having a Z-axis component. In this apparatus, the tool holder may include an adjustable offset mechanism, such as the mechanism of a boring bar tool holder, to permit adjustment of the offset between the tool and the axis of rotation of the tool holder. In a suitable apparatus, the code may include code for causing adjustment thereof. The code may include code for causing synchronous rotation of the workpiece holder and tool holder, (again, within the limits of the machine or within any other desired range of tolerance), or asynchronous rotation. The rotation may be synchronous at a relative speed of rotation of 1:1, 2:1, or 3:1, or any other suitable value. With a suitable apparatus, the code may include code for varying the degree of offset of the tool from the rotational access of the tool holder as the tool and workpiece move together in a Z-direction. In some embodiments, the code may include code for varying the degree of relative rotation of the tool holder and tool as the tool and workpiece move relative to one another in a direction having a Z-axis component. The code may include code for causing other aspects of the heretofore described methods to be performed.

Figure 25:
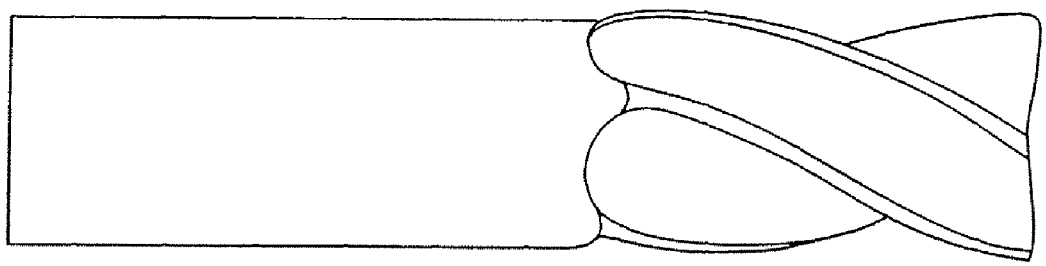
FIG. 25 is a perspective view of a fluted tool useful in conjunction with some embodiments of the invention.

As supplied, the apparatus may or may not be provided with a tool or workpiece. An apparatus that is configured to receive a tool and workpiece is deemed to fall within the purview of some embodiments of the invention. In other embodiments of the invention, an apparatus that has been provided with both a tool and workpiece is deemed to fall within the purview of the present invention. Except as may be otherwise claimed, the invention is not deemed to be limited to any tool depicted herein, and thus fluted tools, such as the tool shown in FIG. 25, may be employed.

It is thus seen that various turned forms, such as ovoid forms, may be prepared.

All references, including publications, patent applications, and patents, cited herein are hereby incorporated by reference. The description of certain embodiments as "preferred" embodiments, and other recitation of embodiments, features, or ranges as being preferred, is not deemed to be limiting, and the invention is deemed to encompass embodiments that are presently deemed to be less preferred. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention unless otherwise claimed. Any statement herein as to the nature or benefits of the invention or of the preferred embodiments is not intended to be limiting, and the appended claims should not be deemed to be limited by such statements. More generally, no language in the specification should be construed as indicating any non-claimed element as being essential to the practice of the invention. This invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention.

What is claimed is:

1. A method comprising:
    providing a rotating workpiece;
    bringing a cutting edge of a tool into contact with said workpiece, said tool being disposed in a rotating tool holder having a rotational axis, said tool having a center axis that is parallel to and offset from the rotational axis of said tool holder to thereby create eccentric rotation of said tool, said cutting edge being disposed on an outer peripheral surface of said tool, said cutting edge further having a continuous circular shape substantially concentric with the center axis of said tool; and
    moving said tool relative to said workpiece in a direction having at least a Z-axis component thereby to cause material to be removed from said workpiece;
    the method including rotating said tool holder and said workpiece synchronously, said rotation being synchronous at a relative speed of rotation of 1:1.

2. A method comprising:
    providing a rotating workpiece;
    bringing a cutting edge of a tool into contact with said workpiece, said tool being disposed in a rotating tool holder having a rotational axis, said tool having a center axis that is parallel to and offset from the rotational axis of said tool holder to thereby create eccentric rotation of said tool, said cutting edge being disposed on an outer peripheral surface of said tool, said cutting edge further having a continuous circular shape substantially concentric with the center axis of said tool; and
    moving said tool relative to said workpiece in a direction having at least a Z-axis component thereby to cause material to be removed from said workpiece;
    the method including rotating said tool holder and said workpiece synchronously, said rotation being synchronous at a relative speed of rotation of 2:1.

3. A method comprising:
    providing a rotating workpiece;
    bringing a cutting edge of a tool into contact with said workpiece, said tool being disposed in a rotating tool holder having a rotational axis, said tool having a center axis that is parallel to and offset from the rotational axis of said tool holder to thereby create eccentric rotation of said tool, said cutting edge being disposed on an outer peripheral surface of said tool, said cutting edge further having a continuous circular shape substantially concentric with the center axis of said tool; and moving said tool relative to said workpiece in a direction having at least a Z-axis component thereby to cause material to be removed from said workpiece;

the method further comprising varying the degree of offset of said tool from the rotational axis of said tool holder as said tool and said workpiece move relative to one another in a Z-direction.

4. A method comprising:

providing a rotating workpiece;

bringing a cutting edge of a tool into contact with said workpiece, said tool being disposed in a rotating tool holder having a rotational axis, said tool having a center axis that is parallel to and offset from the rotational axis of said tool holder to thereby create eccentric rotation of said tool, said cutting edge being disposed on an outer peripheral surface of said tool, said cutting edge further having a continuous circular shape substantially concentric with the center axis of said tool; and moving said tool relative to said workpiece in a direction having at least a Z-axis component thereby to cause material to be removed from said workpiece;

the method further comprising varying the degree of relative rotation of said tool holder and said tool as said tool and said workpiece move relative to one another in a Z-direction.

5. An apparatus comprising:

a workpiece holder;

a rotating tool holder defining a rotational axis, a tool defining a center axis, an outer peripheral surface of said tool having a continuous circular cutting edge substantially concentric with said center axis, said tool holder retaining said tool with said center axis of said tool parallel to and offset from said rotational axis of said tool holder, said workpiece holder and said tool holder being movable relative to one another to permit selective engagement and disengagement of said cutting edge of said tool disposed in said tool holder with a workpiece disposed in said workpiece holder;

a computer control system comprising a computer readable medium having computer executable code disposed thereon and being operatively coupled to said tool holder and to said workpiece holder, said code comprising code for causing rotation of said tool holder and for causing relative movement of said tool holder and said workpiece in a direction having a Z-axis component; and an adjustable offset mechanism to permit adjustment of the offset between said tool and the axis of rotation of said tool holder, said offset mechanism including a pneumatic or hydraulically activated mechanism.

6. An apparatus comprising:

a workpiece holder;

a rotating tool holder defining a rotational axis, a tool defining a center axis, an outer peripheral surface of said tool having a continuous circular cutting edge substantially concentric with said center axis, said tool holder retaining said tool with said center axis of said tool parallel to and offset from said rotational axis of said tool holder, said workpiece holder and said tool holder being movable relative to one another to permit selective engagement and disengagement of said cutting edge of said tool disposed in said tool holder with a workpiece disposed in said workpiece holder; and a computer control system comprising a computer readable medium having computer executable code disposed thereon and being operatively coupled to said tool holder and to said workpiece holder, said code comprising code for causing rotation of said tool holder and for causing relative movement of said tool holder and said workpiece in a direction having a Z-axis component;

wherein said tool has a first surface, a second surface, and at least one side therebetween, said cutting edge is formed a the intersection of the at least one side and the first surface, and said tool comprises a tool that spins about said center axis.

7. An apparatus comprising:

a workpiece holder;

a rotating tool holder defining a rotational axis, a tool defining a center axis, an outer peripheral surface of said tool having a continuous circular cutting edge substantially concentric with said center axis, said tool holder retaining said tool with said center axis of said tool parallel to and offset from said rotational axis of said tool holder, said workpiece holder and said tool holder being movable relative to one another to permit selective engagement and disengagement of said cutting edge of said tool disposed in said tool holder with a workpiece disposed in said workpiece holder; and a computer control system comprising a computer readable medium having computer executable code disposed thereon and being operatively coupled to said tool holder and to said workpiece holder, said code comprising code for causing rotation of said tool holder and for causing relative movement of said tool holder and said workpiece in a direction having a Z-axis component, said code including code for causing synchronous rotation of said workpiece holder and said tool holder, said rotation being synchronous at a relative speed of rotation of 1:1.

8. An apparatus comprising:

a workpiece holder;

a rotating tool holder defining a rotational axis, a tool defining a center axis, an outer peripheral surface of said tool having a continuous circular cutting edge substantially concentric with said center axis, said tool holder retaining said tool with said center axis of said tool parallel to and offset from said rotational axis of said tool holder, said workpiece holder and said tool holder being movable relative to one another to permit selective engagement and disengagement of said cutting edge of said tool disposed in said tool holder with a workpiece disposed in said workpiece holder; and a computer control system comprising a computer readable medium having computer executable code disposed thereon and being operatively coupled to said tool holder and to said workpiece holder, said code comprising code for causing rotation of said tool holder and for causing relative movement of said tool holder and said workpiece in a direction having a Z-axis component, said code including code for causing synchronous rotation of said workpiece holder and said tool holder, said rotation being synchronous at a relative speed of rotation of 2:1.

9. An apparatus comprising:

a workpiece holder;

a rotating tool holder defining a rotational axis, a tool defining a center axis, an outer peripheral surface of said tool having a continuous circular cutting edge substantially concentric with said center axis, said tool holder retaining said tool with said center axis of said tool parallel to and offset from said rotational axis of said tool holder, said workpiece holder and said tool holder being movable relative to one another to permit selective engagement and disengagement of said cutting edge of said tool disposed in said tool holder with a workpiece disposed in said workpiece holder; and a computer control system comprising a computer readable medium having computer executable code disposed thereon and being operatively coupled to said tool holder and to said workpiece holder, said code comprising code for causing rotation of said tool holder and for causing relative movement of said tool holder and said workpiece in a direction having a Z-axis component, said code including code for varying the degree of offset of said tool from the rotational axis of said tool holder as said tool and said workpiece move relative to one another in a direction having at least a Z-axis component.

10. An apparatus comprising:

a workpiece holder;

a rotating tool holder defining a rotational axis, a tool defining a center axis, an outer peripheral surface of said tool having a continuous circular cutting edge substantially concentric with said center axis, said tool holder retaining said tool with said center axis of said tool parallel to and offset from said rotational axis of said tool holder, said workpiece holder and said tool holder being movable relative to one another to permit selective engagement and disengagement of said cutting edge of said tool disposed in said tool holder with a workpiece disposed in said workpiece holder; and a computer control system comprising a computer readable medium having computer executable code disposed thereon and being operatively coupled to said tool holder and to said workpiece holder, said code comprising code for causing rotation of said tool holder and for causing relative movement of said tool holder and said workpiece in a direction having a Z-axis component, said code including code for causing synchronous rotation of said workpiece holder and said tool holder, said code including code for varying the degree of relative rotation of said tool holder and said tool as said tool and said workpiece move relative to one another in a direction having at least a Z-axis component.

* * * * *